United States Patent
Dong et al.

(10) Patent No.: US 10,143,217 B2
(45) Date of Patent: Dec. 4, 2018

(54) AIR INLET ARRANGEMENT FOR ICE CREAM OR YOGURT MACHINE

(71) Applicants: Lingyu Dong, Temple City, CA (US); Chun Dong Dong, Temple City, CA (US)

(72) Inventors: Lingyu Dong, Temple City, CA (US); Chun Dong Dong, Temple City, CA (US)

( * ) Notice: Subject to any disclaimer, the term of this patent is extended or adjusted under 35 U.S.C. 154(b) by 0 days.

(21) Appl. No.: 15/618,074

(22) Filed: Jun. 8, 2017

(65) Prior Publication Data
US 2017/0325478 A1    Nov. 16, 2017

Related U.S. Application Data

(63) Continuation of application No. 13/326,345, filed on Dec. 15, 2011, now Pat. No. 9,706,786.

(51) Int. Cl.
*A23G 9/00* (2006.01)
*A23G 9/22* (2006.01)
*A23G 9/20* (2006.01)

(52) U.S. Cl.
CPC . *A23G 9/22* (2013.01); *A23G 9/20* (2013.01)

(58) Field of Classification Search
CPC .................................. A23G 9/22; A23G 9/20
See application file for complete search history.

(56) References Cited

U.S. PATENT DOCUMENTS 5,072,599 A * 12/1991 Simone .................. A23G 9/163
137/625.3

* cited by examiner

*Primary Examiner* — Anshu Bhatia
(74) *Attorney, Agent, or Firm* — Raymond Y. Chan; David and Raymond Patent Firm

(57) ABSTRACT

An air inlet arrangement for an ice cream machine or yogurt machine includes an air-solution tube supported in a solution container which is adapted for storing a predetermined volume of solution at a predetermined fluid elevation, and an air nozzle. The air-solution tube has an elongated structure defining a top end, a bottom end, and a process channel between the top end and the bottom end, wherein the air-solution tube has a height greater than the fluid elevation of the solution container, wherein a volume of the air-solution tube is such that the air-solution tube is arranged to contain 80 g or less of the solution.

6 Claims, 5 Drawing Sheets

AIR INLET ARRANGEMENT FOR ICE CREAM OR YOGURT MACHINE

CROSS REFERENCE OF RELATED APPLICATION

This is a Continuation application that claims the benefit of priority under 35U.S.C.§ 120 to a non-provisional application, application Ser. No. 13/326,345, filed Dec. 15, 2011. The afore-mentioned patent application is hereby incorporated by reference in its entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to ice cream or yogurt machine, and more particularly to an air inlet arrangement and method for an ice cream or yogurt machine which is capable of maintaining a stable air-solution proportion for making ice cream or yogurt.

Description of Related Art

A conventional air inlet arrangement for an ice cream or yogurt machine usually comprises an elongated air-solution tube and an air nozzle provided on a top end of the air-solution tube wherein air is sucked into the air-solution tube through the air nozzle. Moreover, the air-solution tube further has a solution inlet and a discharge outlet formed thereon, wherein ice cream or yogurt solution is arranged to be sucked into the air-solution tube through the solution inlet. The ice-cream or yogurt solution is then arranged to be mixed with the air and is further processed to form the ice-cream or yogurt.

A major problem with the above-mentioned conventional air inlet arrangement is that every time the air inlet arrangement is used to mix air with ice cream or yogurt solution, a substantial amount of residue is left in the air-solution tube and the residue has not been adequately mixed with air. When the ice-cream or yogurt machine is restarted to produce another serving of ice cream or yogurt, air may not be adequately sucked into the air inlet arrangement. The result is that the solution and the air may not be adequately mixed and the air-solution proportion of the mixture cannot be maintained at an optimal level.

SUMMARY OF THE PRESENT INVENTION

The invention is advantageous in that it provides an air inlet arrangement for an ice cream or yogurt machine which is capable of maintaining a stable air-solution proportion for making ice cream or yogurt.

Another advantage of the invention is to provide an air inlet arrangement and method for an ice cream or yogurt machine, wherein the air inlet arrangement is capable of enhancing an effectiveness of making ice cream or yogurt so as to minimize the production of residue in the air inlet arrangement.

Another advantage of the invention is to provide an air inlet arrangement and method for an ice cream or yogurt machine is capable of minimizing waste of ice cream or yogurt solution by utilizing geometry properties of an air-solution tube and without involving complicated or expensive apparatus.

Additional advantages and features of the invention will become apparent from the description which follows, and may be realized by means of the instrumentalities and combinations particular point out in the appended claims.

According to the present invention, the foregoing and other objects and advantages are attained by providing An air inlet arrangement for an ice cream machine or yogurt machine, comprising:

an air-solution tube supported in a solution container which is adapted for storing a predetermined volume of solution at a predetermined fluid elevation, wherein the air-solution tube has an elongated structure defining a top end, a bottom end, and a process channel between the top end and the bottom end, wherein the air-solution tube has a height greater than the fluid elevation of the solution container, wherein a volume of the air-solution tube is such that the air-solution tube is arranged to contain less than a regular serving size (such as 80 g) of the solution, wherein the air-solution tube has a solution inlet provided thereon for allowing the solution to enter the process channel through the solution inlet; and an air nozzle provided at the top end of the air-solution tube for allowing air to be sucked into the process channel through the air nozzle, wherein the air and the solution is arranged to be mixed in the process channel to form a mixture, which is then discharged out of the air-solution tube through the bottom end thereof.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
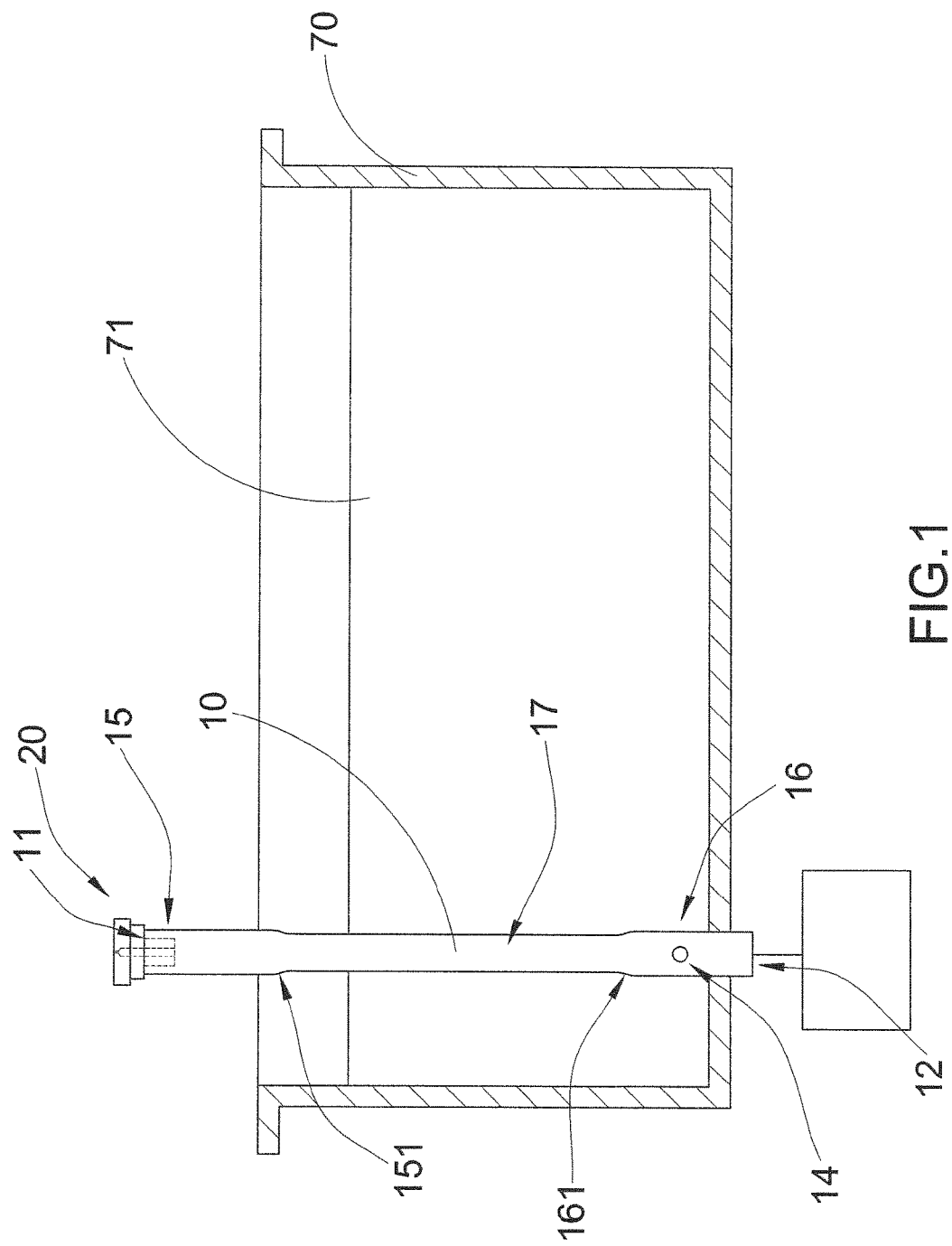
FIG. 1 is a side view of an air inlet arrangement according to a preferred embodiment of the present invention.

Referring to FIG. 1 to FIG. 4 of the drawings, an air inlet arrangement for an ice cream machine or yogurt machine according to a preferred embodiment of the present invention is illustrated, in which the air inlet arrangement comprises an air-solution tube 10, and an air nozzle 20.

The air-solution tube 10 is supported in a solution container 70 which is adapted for storing a predetermined volume of solution 71 at a predetermined fluid elevation, wherein the air-solution tube 10 has an elongated structure defining a top end 11, a bottom end 12, and a process channel 13 between the top end 11 and the bottom end 12, wherein the air-solution tube 10 has a height greater than the fluid elevation contained in the solution container 70, wherein a volume of the air-solution tube 10 is such that the air-solution tube is arranged to contain 80 g or less of the solution 71 (less than a regular serving size), wherein the air-solution tube 10 has a solution inlet 14 provided thereon for allowing the solution to enter the process channel 13 through the solution inlet 14.

The air nozzle 20 is provided at the top end 11 of the air-solution tube 10 for allowing air to be sucked into the process channel 13 through the air nozzle 20, wherein the air and the solution 71 is arranged to be sucked and mixed in the process channel 13 to form a mixture, which is then discharged out of the air-solution tube 10 through the bottom end 12 thereof.

According to a preferred embodiment of the present invention, the air inlet arrangement is supported in an ice-cream or yogurt machine which is arranged to deliver ice cream or yogurt. The air-solution tube 10 has a circular cross section which defines a top portion 15, a bottom portion 16, and a mid portion 17 integrally extended between the top portion 15 and the bottom portion 16, wherein the top end 11 is formed at the top portion 15, while the bottom end 12 is formed at the bottom portion 16.

Furthermore, a diameter of the mid portion 17 of the air-solution tube 10 is smaller than that of the top portion 15 and the bottom portion 16 so that the mid portion 17 constitutes a contracted portion of the air-solution tube 10 for facilitating the ice cream or yogurt solution 71 to contain air by enhancing fluid flow velocity in the mid portion 17. On the other hand, the cross sectional diameters of the top portion 15 and the bottom portion 16 are substantially the same.

It is worth mentioning that the boundary between the top portion 15 and the mid portion 17 defines a first shoulder 151 of the air-solution tube 10, while the boundary between the bottom portion 16 and the mid portion 17 defines a second shoulder 161 of the air-solution tube 10. The contacted mid portion tube 10 to flow at a higher velocity so as to facilitating the efficiency and effectiveness of the containing of air in the ice cream or yogurt solution 71.

It is worth mentioning that an outer surface of the first shoulder 151 and the second shoulder 161 are slanted so as to facilitate gradual decrease in diameter between the top portion 15 and the mid portion 17 and between the mid portion 17 and the bottom portion 16.

Figure 2:
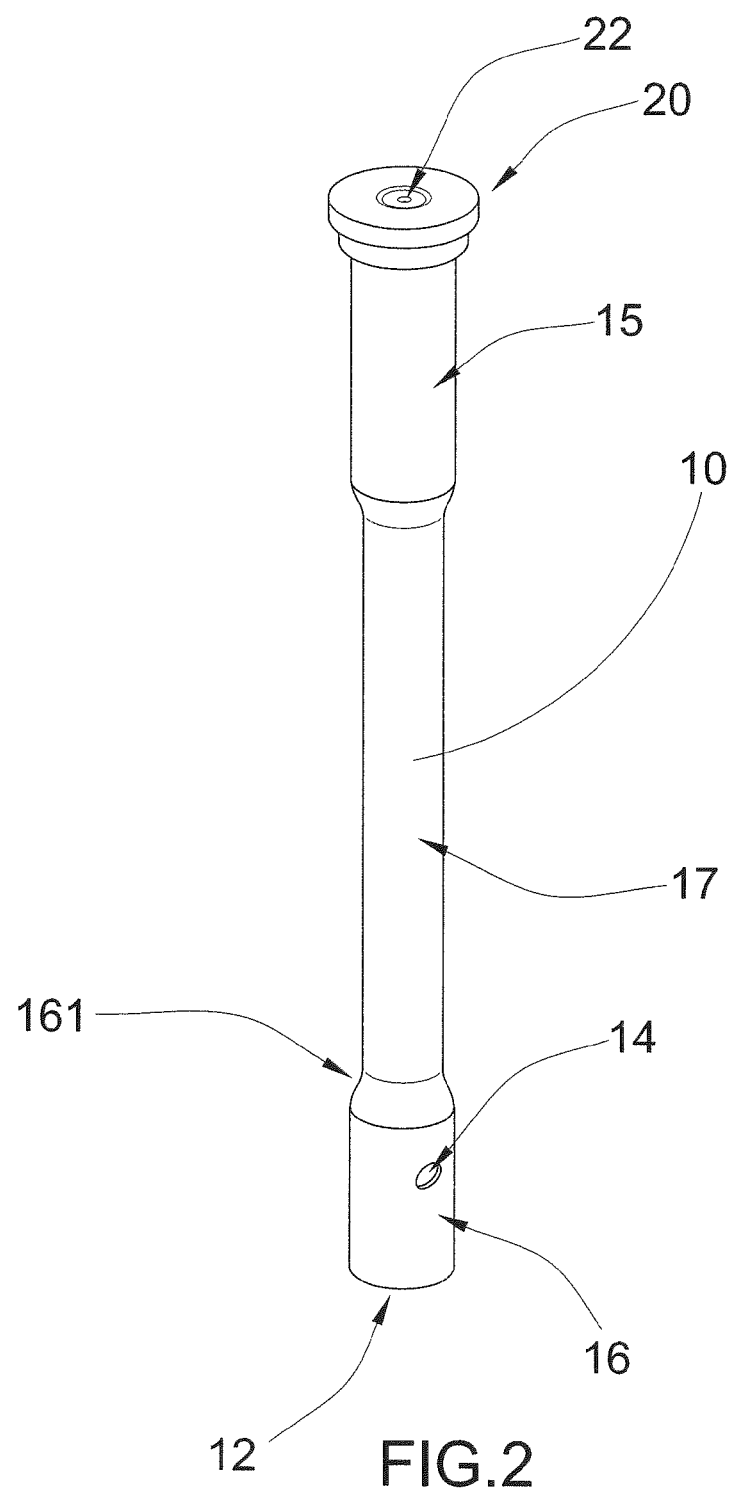
FIG. 2 is a perspective view of the air inlet arrangement according to the above preferred embodiment of the present invention.

Referring to FIG. 2 of the drawings, the solution inlet 14 is formed on the bottom portion 16 of the air-solution tube 10 so that the ice cream or yogurt solution 71 may enter the process channel 13 through the solution inlet 14. When the solution 71 has entered the process channel 13, it is arranged to mix and blend with air coming from the air nozzle 20 so as to form the ice cream or yogurt. It is worth mentioning that the solution inlet 14 is formed on the bottom portion 16 at a position in a vicinity of the second shoulder 161 so that the solution 71 entering the process channel 13 will be met with a jet of air having the maximum velocity. Moreover, since the diameter of the bottom portion 16 is slightly larger than that of the mid portion 17, the volume of the cavity in which the air contained in the solution 71 can be adequately increased.

On the other hand, since the diameter of the top portion 15 is also slightly larger than that of the mid portion 17, this feature ensures that adequate amount of air can be sucked into the process channel 13 for facilitating the containing of air in the ice-cream or yogurt solution.

Figure 3:
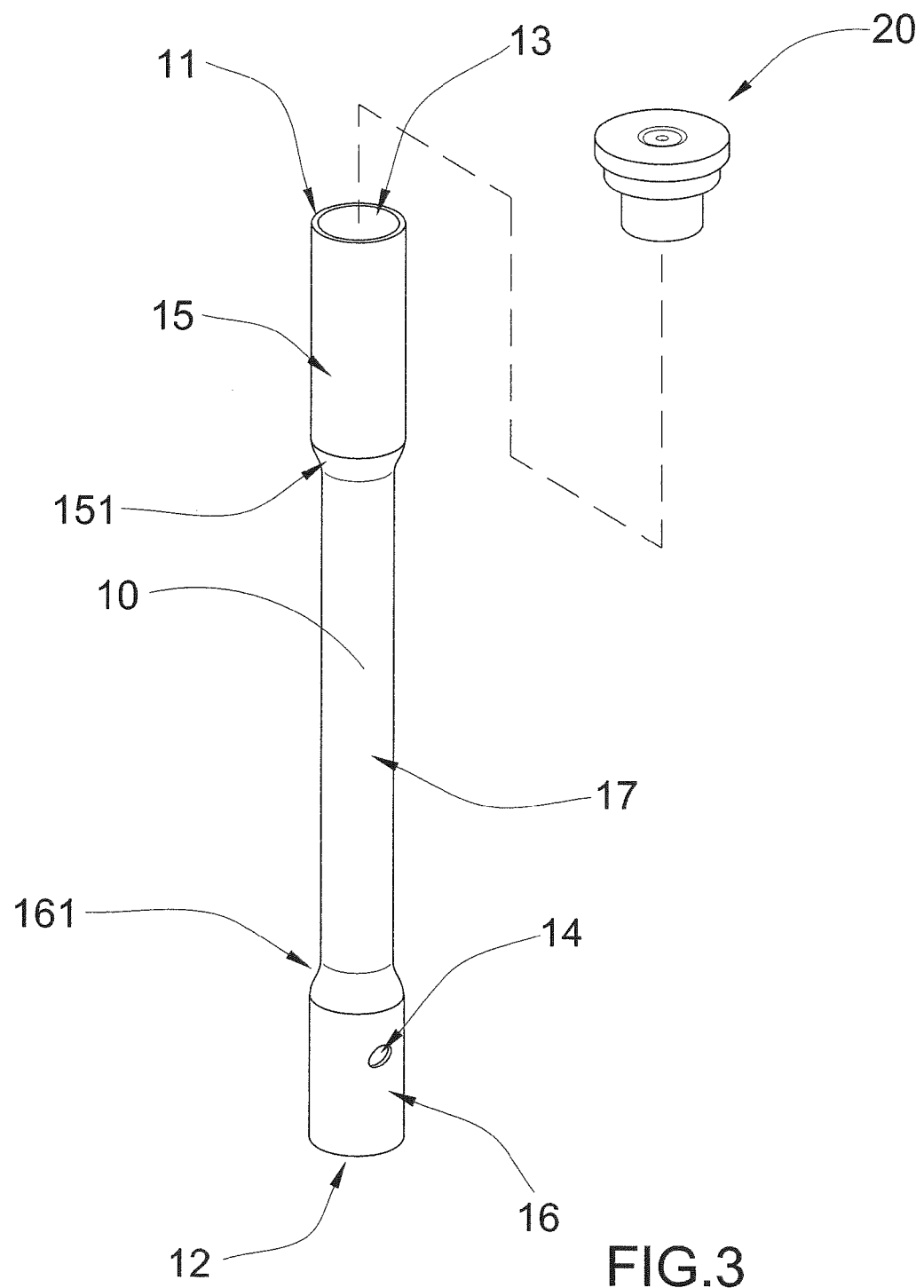
FIG. 3 is a schematic diagram of the air inlet arrangement according to the above preferred embodiment of the present invention.
Figure 4:
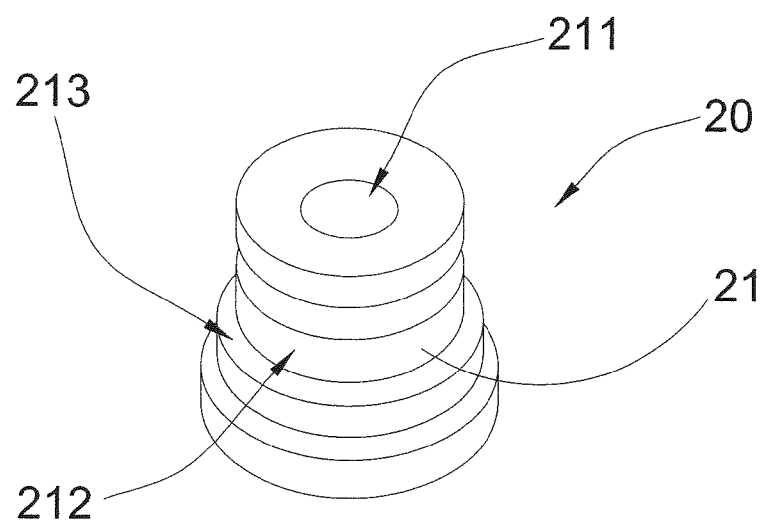
FIG. 4 is a schematic diagram of a nozzle body of the air inlet arrangement according to the above preferred embodiment of the present invention.

As shown in FIG. 3 to FIG. 4 of the drawings, the air nozzle 20 comprises a nozzle body 21 and a nozzle inlet 22 formed on a top side of the nozzle body 21 for communicating the process channel 13 with ambient air. More specifically, the nozzle body 21 has a circular cross section and a nozzle cavity 211 formed therein, wherein the nozzle cavity 211 communicates the nozzle inlet 22 with the process channel 13. Furthermore, the nozzle body 21 further defines a plurality of body sections 212 each having a predetermined cross sectional diameter to form a corresponding number of securing platforms 213 between two body sections 212. In other words, a cross sectional diameter of an upper body section 212 is slightly larger than a cross sectional diameter of a lower body section 212 to form the corresponding securing platform 213 between the two body sections 212. According to the preferred embodiment of the present invention, each of an upper body section 212 has a cross sectional diameter slight larger than that of an adjacent lower body section 212 so as to form the corresponding securing platform 213.

The nozzle body 21 of the air nozzle 20 is arranged to attach on the top end 11 of the air-solution tube 10 in such a manner that the top end 11 is arranged to bias against one of the securing platforms 213 of the nozzle body 21. Hence, a diameter of at least one of the securing platforms 213 is slightly smaller than a cross sectional diameter of the top end 11 of the air-solution tube 10 so that the nozzle body 21 can be securely mounted on the air-solution tube 10.

In this preferred embodiment of the present invention, the solution inlet 14 is preferably circular in cross sectional shape and has a diameter of approximately 4-7 mm. According to the preferred embodiment of the present invention, the diameter of the solution inlet 14 is embodied as 5.5 mm. On the other hand, a cross sectional diameter of the bottom portion 16 of the air-solution tube 10 is preferably approximately 10-20 mm. According to the preferred embodiment of the present invention, the diameter of the bottom portion 16 is embodied as 14 mm or above. In other words, the ratio of the above diameters (i.e. a diameter of the solution inlet 14 to a diameter of the bottom portion 16 of the air-solution tube 10) is approximately 11:28.

As mentioned earlier, the air-solution tube 10 has a height greater than the fluid elevation contained in the solution container 70, wherein a volume of the air-solution tube 10 is such that the air-solution tube is arranged to contain 80 g or less of the solution 71. Preferably, the air-solution tube is arranged to contain approximately 50 g of the solution 71.

Figure 5:
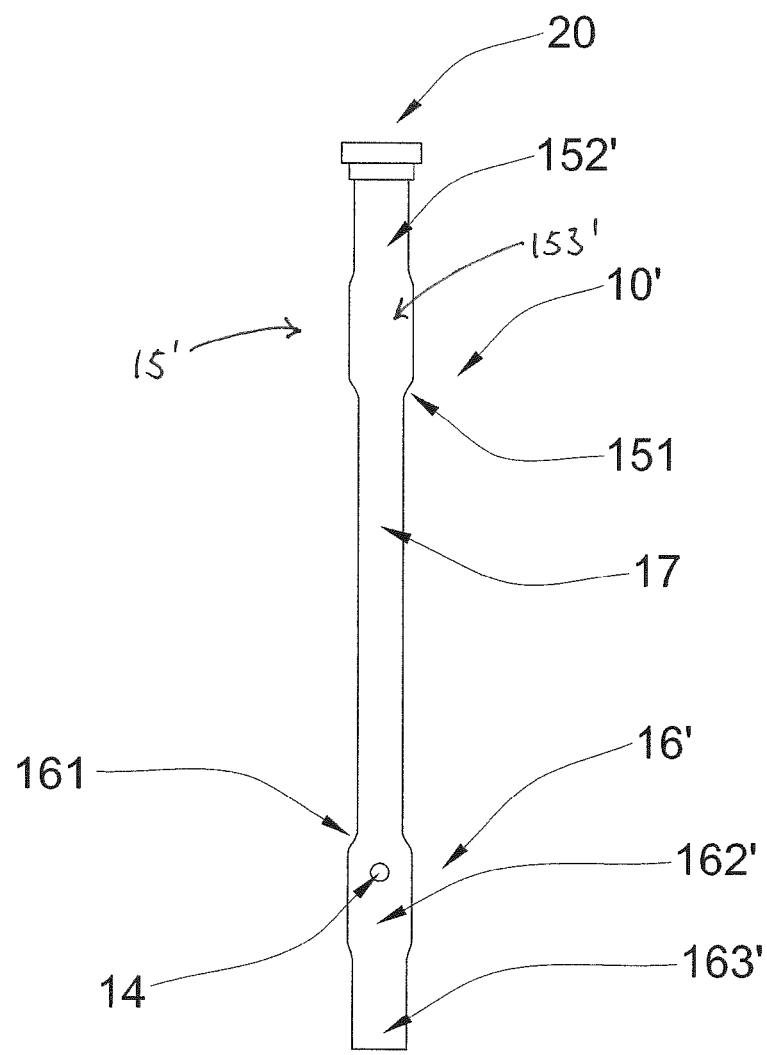
FIG. 5 is an alternative mode of the air inlet arrangement according to the above preferred embodiment of the present invention.

Referring to FIG. 5 of the drawings, an alternative mode of the air inlet arrangement is illustrated. The alternative mode is similar to the preferred embodiment except there is a slight variation on the part of the air-solution tube 10'. According to the alternative mode, the top portion 15' of the air-solution tube 10' is divided into a top upper and a top lower section 152', 153' wherein and top upper section 152' has a cross sectional diameter slightly smaller than that of the top lower section 153' so as to form a slightly contracted upper section 152' of the top portion 15'. Similarly, the bottom portion 16' of the air-solution tube 10' is divided into a bottom upper and a bottom lower section 162', 163' wherein and bottom upper section 162' has a cross sectional diameter slightly larger than that of the bottom lower section 163' so as to form a slightly contracted bottom lower section 162' of the bottom portion 16'.

It is worth mentioning that the smaller bottom lower section 163' allow the mixture of ice cream or yogurt solution and air (i.e. the fluid within the process channel) to have a greater velocity so as to facilitate an even more effective formation of the ice cream or yogurt solution with air.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of premixing air with ice-cream or yogurt solution, comprising the steps of:
   (a) allowing air being sucked into a process channel through an air nozzle provided at a top portion of an air-solution tube supported in a solution container which stores a predetermined volume of ice cream or yogurt solution at a predetermined fluid elevation, wherein said air-solution tube has a height greater than said fluid elevation of said solution container;
   (b) allowing said ice cream or yogurt solution to enter said process channel 5 through a solution inlet provided on a bottom portion of said air-solution tube;
   (c) increasing a flow velocity of said air from said top portion of said air-solution tube;
   (d) premixing said air and said ice cream or yogurt solution entered said process channel through said solution inlet in said process channel of said bottom portion of said process channel; and
   (e) discharging said air and said ice-cream or yogurt solution out of said air-solution tube through a bottom end thereof
   wherein in the step (c), said air-solution tube has a mid portion extended between said top portion and said bottom 15 portion, wherein at least one of said top portion and said bottom portion of said air-solution tube has a size larger than that of said mid portion and said solution inlet is formed at said bottom portion to constitute a contracted portion of said air-solution tube for enhancing fluid flow velocity in said mid portion of said air-solution tube and for ensuring adequate amount of air to be sucked into said process channel via said top end 20 of said air-solution tube to facilitate the containing of air in the ice-cream or yogurt solution.

2. The method, as recited in claim 1, wherein both said top portion and said bottom portion of said air-solution tube has a size larger than that of said mid portion of said air-solution.

3. The method, as recited in claim 2, wherein a boundary between said top portion and said mid portion defines a first shoulder of said air-solution tube, while a boundary between said bottom portion and said mid portion defines a second shoulder of said air-solution tube, wherein an outer surface of said first shoulder and said second shoulder are slanted, so as to facilitate gradual decrease in diameter between said top portion and said mid portion and between said mid portion and said bottom portion, wherein said solution inlet is formed on said bottom portion at a position which is in a vicinity of said second shoulder so that said solution entering said process channel is to be met with a jet of air having maximum velocity within said air-solution tube.

4. The method, as recited in claim 1, wherein said air nozzle comprises a nozzle body and a nozzle inlet formed on a top side of said nozzle body for communicating said process channel with ambient air, wherein said nozzle body has a circular cross section and a nozzle cavity formed therein, wherein said nozzle cavity communicates said nozzle inlet with said process channel.

5. The method, as recited in claim 3, wherein said air nozzle comprises a nozzle body and a nozzle inlet formed on a top side of said nozzle body for communicating said process channel with ambient air, wherein said nozzle body has a circular cross section and a nozzle cavity formed therein, wherein said nozzle cavity communicates said nozzle inlet with said process channel.

6. The method, as recited in claim 5, wherein said nozzle body further defines a plurality of body sections each having a predetermined cross sectional diameter to form a corresponding number of securing platforms between two body sections, wherein a size of an upper body section is slightly larger than a size of a lower body section to form said corresponding securing platform between said two body sections, wherein said nozzle body of said air nozzle is arranged to attach on said top end of said air-solution tube in such a manner that said top end is arranged to bias against one of said securing platforms of said nozzle body, wherein a size of at least one of said securing platforms is slightly smaller than a size of said top end of said air-solution tube so that said nozzle body is capable of being securely mounted on said air-solution tube.

* * * * *